United States Patent [19]
Lecuyer

[11] 3,967,259
[45] June 29, 1976

[54] SECURITY SYSTEM WITH PLURAL SENSORS CONNECTED IN PARALLEL ACROSS THE TRANSMISSION LINE

[75] Inventor: Daniel Marie Pierre Lecuyer, Le Pecq, France

[73] Assignee: La Detection Electronique Francaise Protecbat, Vanves, France

[22] Filed: Dec. 17, 1973

[21] Appl. No.: 425,659

Related U.S. Application Data
[63] Continuation of Ser. No. 240,720, April 3, 1972, abandoned.

[30] Foreign Application Priority Data
Apr. 7, 1971   France .............................. 71.12290

[52] U.S. Cl. .......................... 340/258 D; 340/261; 340/409; 340/15.5 MC
[51] Int. Cl.² ......................................... G08B 13/00
[58] Field of Search .............. 340/6 R, 16 R, 258 B, 340/258 D, 261, 1 T, 15.5 MC; 329/186, 192, 193; 346/33 C; 181/112, 122, 125

[56] References Cited
UNITED STATES PATENTS

| | | |
|---|---|---|
| 3,109,165 | 10/1963 | Bagno .................................. 340/261 |
| 3,258,762 | 6/1966 | Donner ............................... 340/16 R |
| 3,260,991 | 7/1966 | Laakmann ......................... 340/16 R |
| 3,579,220 | 5/1971 | Stevenson ........................... 340/261 |
| 3,585,581 | 6/1971 | Aune et al. ....................... 340/258 B |
| 3,652,979 | 3/1972 | Angelle ......................... 340/15.5 TS |
| 3,818,471 | 6/1974 | Kurschner ........................... 340/261 |

*Primary Examiner*—Nelson Moskowitz
*Attorney, Agent, or Firm*—Sughrue, Rothwell, Mion, Zinn & Macpeak

[57] ABSTRACT

A security system for seismicly detecting intrusion into an enclosure. A plurality of sensor units are electrically connected in parallel across a two wire transmission line. The sensing elements are coupled to the line through high output impedence amplifiers to negate any signal attenuating shunt paths. The readout end of the line is closed through a characteristic impedance resistor to avoid signal reflections, and the remote end of the line is closed through relatively high resistors to avoid sensor signal absorption or attenuation.

5 Claims, 1 Drawing Figure

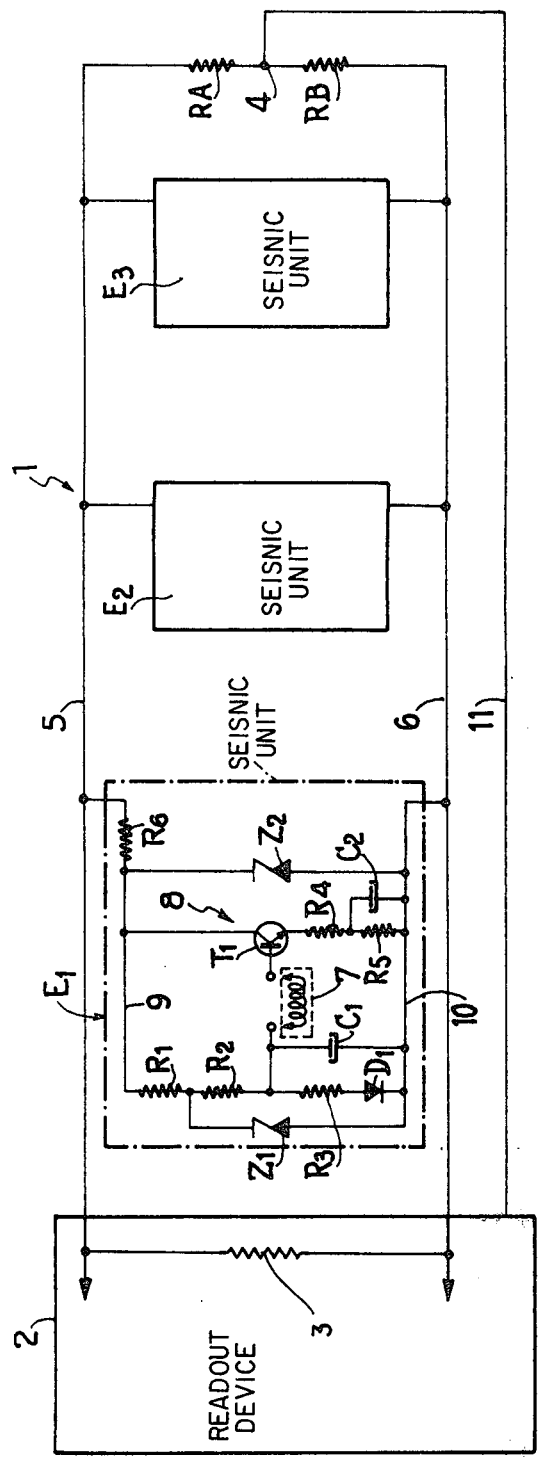

SECURITY SYSTEM WITH PLURAL SENSORS CONNECTED IN PARALLEL ACROSS THE TRANSMISSION LINE

This is a continuation of application Ser. No. 240,720 filed Apr. 3, 1972 and now abandoned.

The present invention relates to an apparatus for supervising an enclosure such as a locality, building, dwelling, region of ground and the like, and employs detecting elements in the form of seismic sensors. These seismic sensors are responsive to trembling caused for example by the intrusion of a person in this enclosure and generate electrical signals which can be detected by an electronic detecting device for example by alarm actuating means.

In known apparatuses of this type, a group of seismic sensors are connected in series in a transmission line which is connected to a reading apparatus which is capable of signalling the excitation of one or more sensors and possibly generates an information. These sensors are distributed in a suitable manner in the enclosure. It has been found that this series arrangement of the sensors gives the best results, bearing in mind their characteristics, but it has nonetheless a number of drawbacks.

First, the output level of the sensors is relatively low whereas by the very fact of the series connection the line operates as an attenuator rendering the suitable reading of the useful signal very difficult to achieve.

Further, the characteristic impedance of the line cannot be constant throughout its length and the line closing impedance is unmatched with the output impedance of the reading means.

Another drawback resides in the fact that the whole of the line and the sensors operate as a transmission line loaded at random intervals since the distance between the seismic sensors is necessarily chosen as a function of their position in the enclosure to be protected. Obvious drawbacks result as concerns the band pass of the line.

Further, if a plurality of sensors receive a mechanical trembling signal at different phases, each one gives out an electrical signal which, when combined with the signals produced by the other sensors, gives a total signal of random value which is greater or less than the signal pertaining to each sensor.

An object of the invention is to remedy the drawbacks of these known apparatuses.

The invention provides a system for supervising an enclosure, comprising a plurality of seismic sensors distributed in the enclosure, and a reading device connected to the sensors through a transmission line, wherein each sensor is connected to the transmission line through an amplifier, the outputs of the amplifiers being connected in parallel in said line.

Owing to these features it is possible to increase the output level of the useful signal issuing from each sensor.

The noise at the input of the reading device is composed of thermic noises, parasitic noises picked up by the sensors and induction noises transmitted by the transmission line and picked up throughout the length of its path.

As the thermic and induction noises are statistically fixed and as according to the invention the level of the signals applied to the transmission line is higher than in known systems, the signal/noise ratio transmitted is distinctly improved.

Further, the parallel connection of the combinations of the sensors and amplifiers avoids the attenuating effect produced by the attenuation of the sensors in the series connection of the known technique.

According to another feature of the invention, each amplifier has a high output impedance so that its influence on the impedance of the transmission line is negligible. In these circumstances, the line can be closed through its characteristic impedance for the frequency band employed.

Other features and characteristics of the invention will appear from the ensuing description with reference to the accompanying drawing in which the single FIGURE shows a supervising system according to a preferred embodiment of the invention.

This FIGURE shows a transmission line 1 which is connected at one end to a reading device 2 having a supply source (not shown). This reading device can moreover include a signalling or alarm means. The transmission line is closed through its characteristic impedance 3 and connected at the end of the line to two resistors RA and RB having a junction point 4.

Connected between the conductors 5 and 6 of the transmission line 1 are seismic sensor-amplifier units, $E_1$, $E_2$...$E_n$ of which only the unit $E_1$ is shown in detail. These units are suitably arranged and distributed in the enclosure to be supervised.

Each seismic sensor-amplifier unit $E_1$, $E_2$, $E_3$...$E_n$ comprises a seismic sensor 7 of any conventional type and an amplifier 8 whose operative element is constituted by transistor $T_1$. The emitter-collector path of this transistor is connected between two conductors 9 and 10 which are respectively connected to the conductors 5 and 6 of the transmission line 1.

The transistor $T_1$ is polarized by a series of resistors $R_1$, $R_2$ and $R_3$ completed by a diode $D_1$ and by emitter resistors $R_4$, $R_5$. The series $R_1$, $R_2$, $R_3$ and $D_1$ is connected between the conductors 9 and 10 and the resistor $R_5$ is connected to the conductor 10.

The function of the diode $D_1$ is to stabilize the supply current arriving by way of the line. This stabilization is achieved as a function of possible temperature drift.

A Zener diode $Z_1$ is connected between the conductor 10 and the junction point of the resistors $R_1$ and $R_2$. It maintains the supply voltage of the base of the transistor $T_1$ at a fixed value, irrespective of the voltage drop in the line 1 so long as the supply voltage is sufficient.

A resistor $R_4$ is connected in the conductor 9 just upstream of the connection to the conductor 5, whereas a Zener diode $Z_2$ is connected between the conductors 9 and 10. The resistor $R_6$ and the Zener diode $Z_2$ protect the circuit against parasitic current inductions. A capacitor $C_1$ is connected between one of the terminals of the seismic sensor 7 and the conductor 10. In this way it conducts the signal issuing from the sensor directly to the conductor 10.

The resistor $R_4$, which may be adjustable, permits adjusting the gain of the amplifier 8 at a desired value.

The resistor $R_5$ is shunted by a capacitor $C_2$. By suitably choosing the values of the capacitors $C_1$, $C_2$ and the value of the resistor $R_5$, it is easy to modify the band pass of the amplifier, these components constituting a feedback circuit for the useful signal.

Further, by suitably determining the values of the resistors $R_2$ and $R_3$ the transistor $T_1$ can be brought to the limit of the blocking state, so that only the positive part of the useful signal is transmitted.

The transistor $T_1$ is connected as a common emitter. It is of a type having a very high output admittance such as a bipolar transmitter having a high gain and low emitter current. It is for example preferred to employ a transistor of the 2N24-84 type or an equivalent type. Thus, the amplifier 8 has an output impedance which practically does not load the line 1. The assembly of the amplifiers is loaded by the line-closing resistor 3.

A signal furnished by one or by a plurality of the sensors 7 can thus be transmitted in the amplified state through the transmission line 1 to the reading device 2 where it may actuate some signalization or alarm signal.

As can be seen in the FIGURE, the circuit of the system according to the invention is completed by a conductor 11 which connects the junction point 4 to the reading device 2. Indeed, the transmission line 1 can be grounded, shorted or cut off, the mid-point 4 then being representative of the state of the line 1 and thus permitting a check of the state of the line in the reading device through the line 11.

The value of the resistors RA and RB must be high with respect to the characteristic impedance of the line.

Having described my invention what I claim as new and desire to secure by Letters Patent is:

1. In a security system for seismically detecting intrusions into a physically defined enclosure and including a plurality of seismic sensors arranged in a spaced distribution throughout the enclosure, a two wire electrical transmission line, means individually connecting each sensor in parallel across the two wires of the transmission line, and a readout device connected to one end of the transmission line, the improvements characterized by:

a. the connecting means each including an amplifier having its input connected to a sensor and its output connected to the transmission line, whereby each sensor is always active and on-line, each amplifier having a high output impedance with respect to the impedance of the transmission line whereby each sensor and amplifier combination has a negligible influence on the impedance of the transmission line and does not provide any substantial attenuating shunt path for the signals from the other sensor and amplifier combinations, b. readout impedance means connected across said one end of the transmission line, the value of said impedance means being equal to the characteristic impedance of the transmission line at the seismic frequency range within which the system operates to thereby avoid any signal reflections, c. two resistors connected in series across the other end of the transmission line, the value of the resistors being high relative to the characteristic impedance of the transmission line whereby the resistors do not provide any substantial attenuating shunt path for the signals from the sensor and amplifier combinations, and d. means connecting a junction point between the resistors to the readout device to thereby implement the monitoring of the transmission line for grounding, shorting and cutting.

2. A system as claimed in claim 1, wherein each amplifier has a transistor connected as a common emitter in a polarization circuit, the sensor being connected to the base of the transistor, the collector-emitter path being connected between the conductors of the transmission line.

3. A system as claimed in claim 2, comprising a feedback circuit between the emitter and the base of the transistor for adjusting the band pass of the amplifier.

4. A system as claimed in claim 2, comprising a resistor and a Zener diode connected upstream of the amplifier so as to protect the amplifier from parasitic signals which may be picked up by the transmission line.

5. A system as claimed in claim 2, comprising means for stabilizing the polarization of said transistor.

* * * * *